US009991979B2

(12) United States Patent
Wu

(10) Patent No.: US 9,991,979 B2
(45) Date of Patent: Jun. 5, 2018

(54) METHOD AND DEVICE FOR GROUPING USER EQUIPMENTS IN PROXIMITY SERVICES RESTRICTED DISCOVERY

(71) Applicant: Acer Incorporated, New Taipei (TW)

(72) Inventor: Chien-Cheng Wu, New Taipei (TW)

(73) Assignee: ACER INCORPORATED, New Taipei (TW)

(*) Notice: Subject to any disclaimer, the term of this patent is extended or adjusted under 35 U.S.C. 154(b) by 110 days.

(21) Appl. No.: 15/079,485

(22) Filed: Mar. 24, 2016

(65) Prior Publication Data
US 2016/0352445 A1 Dec. 1, 2016

(30) Foreign Application Priority Data

May 26, 2015 (TW) .............. 104116758 A

(51) Int. Cl.
| H04H 20/38 | (2008.01) |
| H04L 29/12 | (2006.01) |
| H04W 4/00 | (2018.01) |
| H04W 84/20 | (2009.01) |
| H04L 29/06 | (2006.01) |
| H04W 4/02 | (2018.01) |
| H04W 36/32 | (2009.01) |
| H04L 12/18 | (2006.01) |
| H04W 48/12 | (2009.01) |
| H04W 4/06 | (2009.01) |
| H04W 88/02 | (2009.01) |
| H04W 88/08 | (2009.01) |
(Continued)

(52) U.S. Cl.
CPC .......... *H04H 20/38* (2013.01); *H04L 12/185* (2013.01); *H04L 61/6054* (2013.01); *H04L 69/28* (2013.01); *H04W 4/005* (2013.01); *H04W 4/025* (2013.01); *H04W 36/32* (2013.01); *H04W 48/12* (2013.01); *H04W 84/20* (2013.01); *H04W 4/06* (2013.01); *H04W 8/186* (2013.01); *H04W 84/04* (2013.01); *H04W 88/02* (2013.01); *H04W 88/08* (2013.01)

(58) Field of Classification Search
None
See application file for complete search history.

(56) References Cited

U.S. PATENT DOCUMENTS

2007/0091889 A1* 4/2007 Xiao ................ H04L 1/1854
370/390
2008/0281938 A1 11/2008 Rai et al.
(Continued)

OTHER PUBLICATIONS

European Search Report, dated Jun. 27, 2016, issued in application No. 16164057.8-1853.

Primary Examiner — Eunsook Choi
(74) Attorney, Agent, or Firm — McClure, Qualey & Rodack, LLP

(57) ABSTRACT

A grouping method based on machine type communication (MTC), used in a communications system, including: broadcasting, by a base station, grouping requests to a plurality of user equipments (UEs) in an area; determining, by the base station, whether there is at least one group leader among the UEs; and receiving, by the base station, a grouping report from the group leader when determining that there is a group leader among the UEs, wherein the grouping report records UE identifiers of the UEs in a group corresponding to the group leader.

26 Claims, 11 Drawing Sheets

(51) Int. Cl.
*H04W 8/18* (2009.01)
*H04W 84/04* (2009.01)

(56) References Cited

U.S. PATENT DOCUMENTS

| | | |
|---|---|---|
| 2010/0208662 A1* | 8/2010 | Fuste Vilella ........ H04W 40/00 370/328 |
| 2013/0195081 A1* | 8/2013 | Merlin ................ H04W 74/002 370/336 |
| 2014/0233458 A1 | 8/2014 | Georgescu et al. |
| 2015/0065148 A1 | 3/2015 | de Pasquale et al. |
| 2015/0098460 A1* | 4/2015 | Wang .................... H04W 4/08 370/338 |
| 2016/0037569 A1* | 2/2016 | Kim ..................... H04W 4/008 455/450 |
| 2016/0073429 A1* | 3/2016 | Oteri ................ H04W 74/0816 370/338 |
| 2016/0105500 A1* | 4/2016 | Anchan ............... H04L 67/1051 370/329 |
| 2016/0323275 A1* | 11/2016 | Choi .................. H04L 63/0869 |

* cited by examiner

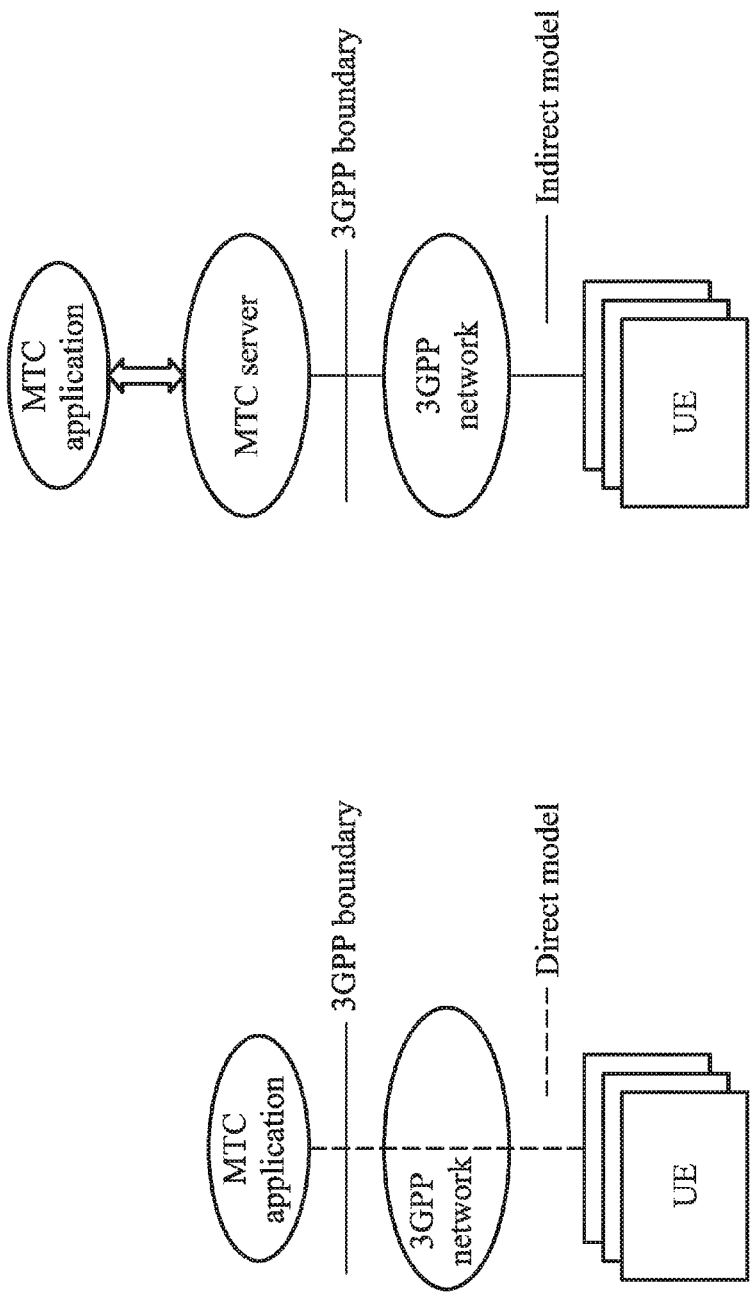

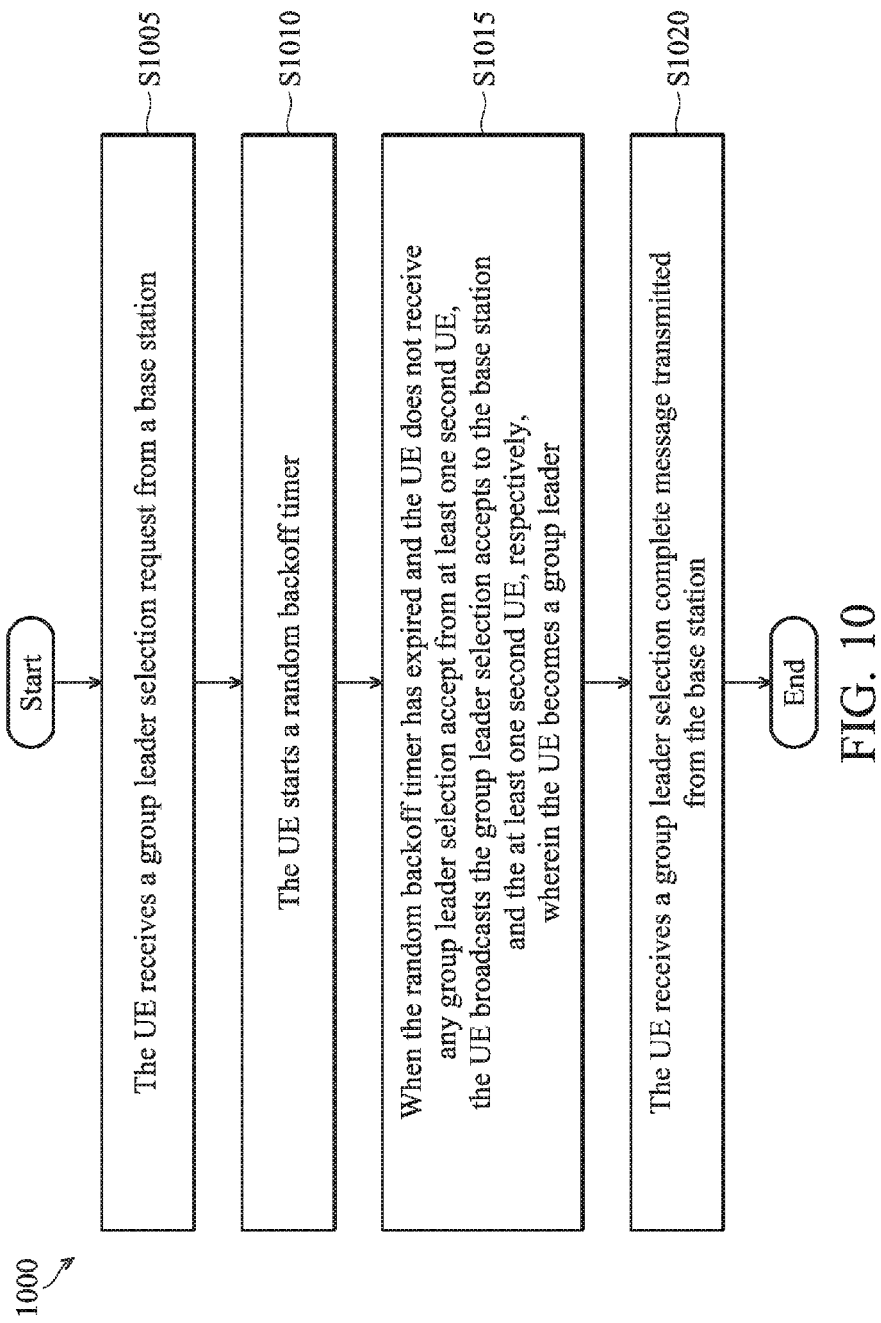

METHOD AND DEVICE FOR GROUPING USER EQUIPMENTS IN PROXIMITY SERVICES RESTRICTED DISCOVERY

CROSS REFERENCE TO RELATED APPLICATIONS

This application claims priority to Taiwan Patent Application No. 104116758, filed on May 26, 2015. The content of the above applications are incorporated by reference in their entirety.

BACKGROUND OF THE INVENTION

Field of the Invention

Aspects of the present invention relate generally to a wireless communications network, and more particularly, to a method and a communications device for grouping user equipments (UEs) in Proximity-based Services (ProSe) restricted discovery in wireless communications systems.

Description of the Related Art

For a long time, various machines have been provided to make our lives more convenient in every way. Nowadays, machines are generally equipped with computing processors and software to accommodate us with more intelligence-based services. With the advancement of wireless communications, Machine Type Communication (MTC) technology has been developed to enable wireless communications between remote machines for exchanging information and operating without human interaction. Especially for critical public infrastructure, such as water treatment facilities, bridges or nature reserves, MTC sensors may be employed to monitor the operation statuses of facilities or statuses of environmental measurements and to report measurement results back to control centers via a wireless communication technology, such as the Global System for Mobile communications (GSM) technology, General Packet Radio Service (GPRS) technology, Enhanced Data rates for Global Evolution (EDGE) technology, Wideband Code Division Multiple Access (WCDMA) technology, High Speed Packet Access (HSPA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, Time-Division LTE (TD-LTE) technology, etc.

In order to deploy machine type communication (MTC) services on large open area coverage devices which have low mobility and are lower cost, users/service operators manage the devices by groups. Therefore, the users/service operators can transmit command messages to the devices in the groups instead of transmitting the command messages to the devices individually, or can receive the messages from the devices in the groups instead of receiving the messages from the devices individually, so that it can save resources in UEs and networks/servers. In addition, according to the specification defined in the 3GPP (The 3rd Generation Partnership Project, 3GPP) TS22.368, the MTC systems should be optimized to handle the MTC groups. However, in the prior art, it only defines how to pass group messages to the devices in groups (for example, by cell broadcast, Multimedia Broadcast Multicast Services, MBMS), IP multicast, etc.), but it is not clear how to group the devices into groups.

Thus, a grouping method, device, and communications system based on MTC are needed to solve the problems described above.

BRIEF SUMMARY OF THE INVENTION

A detailed description is given in the following embodiments with reference to the accompanying drawings.

A grouping method, a communication device system and a communications system based on machine type communication (MTC) are provided.

In a preferred embodiment, the invention is directed to a grouping method based on machine type communication (MTC), used in a communications system, comprising: broadcasting, by a base station, grouping requests to a plurality of user equipments (UEs) in an area; determining, by the base station, whether there is at least one group leader among the UEs; and receiving, by the base station, a grouping report from the group leader when determining that there is a group leader among the UEs, wherein the grouping report records UE identifiers of the UEs in a group corresponding to the group leader.

In some embodiments, the method further comprises: starting, by the base station, a first timer; determining that there is no group leader among the UEs when the first timer has expired and the base station does not receive the grouping report from the group leader; and performing a local group leader selection process. In some embodiments, the local group leader selection process further comprises: broadcasting, by the base station, group leader selection requests to the UEs; starting, by the UEs, a respective random backoff timer after the UEs receive the group leader selection requests; and unicasting, by the UEs corresponding to the respective random backoff timers, a group leader selection accept to the base station and broadcasting the group leader selection accepts to remaining UEs, respectively, when the respective random backoff timer has expired, wherein a first UE whose random backoff timer has expired and which does not receive the group leader selection accepts from the remaining UEs becomes the group leader. In some embodiments, the local group leader selection process further comprises: stopping the respective random backoff timer after the remaining UEs receive the respective group leader selection accept. In some embodiments, the local group leader selection process further comprises: starting a second timer after the base station receives the group leader selection accept transmitted from the first UE; and transmitting, by the base station, a group leader selection complete message to the group leader when the second timer has expired. In some embodiments, the local group leader selection process further comprises: starting, by the group leader, a third timer, and receiving a respective grouping response transmitted by the remaining UEs, wherein the grouping response at least includes a UE identifier corresponding to the UE itself; and generating, by the group leader, the grouping report according to the grouping responses, and transmitting the grouping report to the base station after the third timer has expired. In some embodiments, before the base station broadcasts the grouping requests to the plurality of UEs, the method further comprises: receiving, by the base station, a grouping instruction transmitted by a Machine Type Communication (MTC) application/a MTC server, wherein the grouping instruction is used to request a grouping result report of all UEs in the area. In some embodiments, after the base station receives the grouping report from the group leader, the method further comprises: transmitting, by the base station, the grouping report to a Mobility Management Entity (MME); and transmitting, by the MME, the grouping result report to the MTC application/the MTC server according to the grouping report, wherein the grouping result report includes at least one group identifier and an International Mobile Subscriber Identification (IMSI) list. In some embodiments, the method further comprises: transmitting, by the MME, the grouping result report to the base station according to the grouping report. In some embodiments, the method further comprises: transmitting, by the base station, a group-grouping result report to the group leader. In some embodiments, the method further comprises: setting the random backoff timer of the group leader to 0.

In a preferred embodiment, the invention is directed to a grouping method based on machine type communication (MTC), used in an user equipments (UE), comprising: receiving a group leader selection request; starting a random backoff timer; and broadcasting the group leader selection accepts to the base station and at least one second UE, respectively, when the random backoff timer has expired and the UE does not receive any group leader selection accept from the at least one second UE, wherein the UE becomes a group leader; and receiving a group leader selection complete message transmitted from the base station.

In some embodiments, the method further comprises: stopping the respective random backoff timer when the second UEs receive the respective group leader selection accepts.

In a preferred embodiment, the invention is directed to a communications system for grouping user equipments (UEs) based on machine type communication (MTC). The communications system comprises: a base station and a plurality of UEs. The base station broadcasts grouping requests. The plurality of UEs receive the respective grouping requests. The base station determines whether there is at least one group leader among the UEs. Then, the base station receives a grouping report from the group leader when determining that there is a group leader among the UEs, wherein the grouping report records UE identifiers of the UEs in a group corresponding to the group leader.

In a preferred embodiment, the invention is directed to a communication device for grouping user equipments (UEs) based on machine type communication (MTC). The communication device comprises: a control circuit, a processor and a memory. The processor is installed in the control circuit. The memory is installed in the control circuit and operatively coupled to the processor. The processor is configured to execute a program code stored in the memory to: receive a group leader selection request transmitted from a base station; start a random backoff timer; and broadcast the group leader selection accepts to the base station and at least one second UE, respectively, when the random backoff timer has expired and the UE does not receive any group leader selection accept from the at least one second UE, wherein the UE becomes a group leader; and receive a group leader selection complete message transmitted from the base station.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2A shows a model in which communication is directly performed without an MTC server.

FIG. 2B shows a model in which an MTC server (e.g., an SCS) is located outside a 3GPP network.

FIG. 10 is a flow chart illustrating a grouping method based on MTC according to an embodiment of the invention, and the method is used in an user equipments (UE).

DETAILED DESCRIPTION OF THE INVENTION

Figure 1:
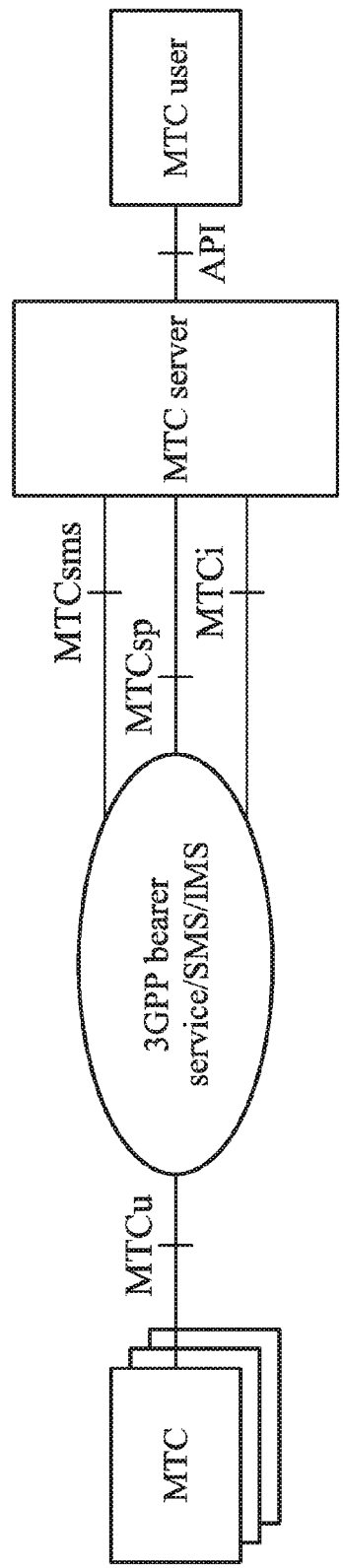
FIG. 1 is a diagram showing a 3rd Generation Partnership Project (3GPP) service model supporting machine type communication (MTC).

Several exemplary embodiments of the present disclosure are described with reference to FIGS. 1 through 10, which generally relate to a grouping method, a communications system, and a communications device based on machine type communication (MTC). It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP Long Term Evolution (LTE), LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing communications systems and methods herein, a wireless communication device may alternatively be referred to as a mobile station, a User Equipment (UE), an access terminal, a subscriber station, a mobile terminal, a remote station, a user terminal, a terminal, a subscriber unit, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a User Equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote a wireless communication device and/or a base station.

FIG. 1 is a diagram showing a 3rd Generation Partnership Project (3GPP) service model supporting machine type communication (MTC). An MTC architecture defined in 3GPP may include an MTC device, an MTC server and an MTC user as shown in FIG. 1. In addition, the MTC server may be connected to a radio network via a 3GPP bearer service, a short message service (SMS) or an IMS (the bearer service means an end-to-end information delivery service from the viewpoint of a network, unlike an end-to-end connection from the viewpoint of a user). The MTC server performs communication with a radio network or with the MTC device via a radio network and may correspond to an MTC service platform for providing an access interface to an MTC user. The MTC user may access the MTC server via an application programming interface (API).

Reference points shown in FIG. 1 are described. The reference point MTCu provides MTC devices access to 3GPP network for the transport of user plane and control plane traffic. The MTCu interface could be based on Uu (interface between a UE and a NodeB in WCDMA), Um (interface a mobile station (MS) and a base transceiver station (BTS) in GSM), Ww (interface between a UE and a WLAN access network) and LTE-Uu interface (interface between a UE and an eNodeB in LTE). MTCi is the reference point that the MTC server uses to connect the 3GPP network and thus communicates with the MTC device via 3GPP bearer services/IMS. MTCi could be based on Gi, Sgi, and Wi interface. MTCsp is the reference point that the MTC server uses for signaling with the 3GPP network. MTCsms is the reference point that the MTC server uses to connect the 3GPP network and thus communicates with the MTC device via 3GPP SMS.

As shown in FIG. 1, in an MTC network architecture defined in the current 3GPP standard, a method of utilizing an existing 3GPP bearer service was proposed. Additionally, a method of utilizing an SMS for data exchange between an MTC device and an MTC server was proposed. This considers characteristics of an MTC application for the purpose of transmitting/receiving small amounts of data such as metering information or product information. An existing SMS method and an IMS based SMS method may be used. In the example of FIG. 1, MTCsms is a data exchange interface using an existing SMS method and MTCi indicates a data exchange interface using an IMS based SMS method.

Figure 2C:
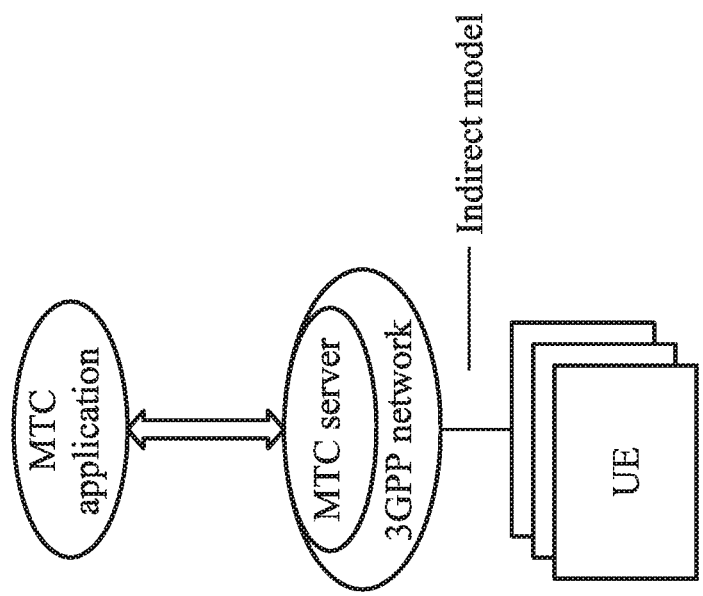
FIG. 2C shows a model in which an MTC server is located inside a 3GPP network.

FIGS. 2A~2C are schematic diagrams that illustrate MTC communication models.

MTC applications are executed in the MTC device and the MTC application server to interwork via communication using a network. At this time, various models of the MTC traffic may be implemented depending upon what participates in communication between an MTC application and a 3GPP network. FIG. 2A shows a model in which communication is directly performed without an MTC server, FIG. 2B shows a model in which an MTC server (e.g., an SCS) is located outside a 3GPP network, and FIG. 2C shows a model in which an MTC server is located inside a 3GPP network. In addition, FIG. 2A corresponds to a direct communication scheme controlled by a 3GPP operator, FIG. 2B corresponds to a communication scheme controlled by a service provider, and FIG. 2C corresponds to a communication scheme controlled by a 3GPP operator.

The direct model of FIG. 2A shows that the MTC application directly performs communication with a UE (or an MTC device) with respect to the 3GPP network as an over-the-top (OTT) application.

The indirect models of FIGS. 2B and 2C show that the MTC application indirectly performs communication with the UE (or the MTC device) using a supplementary service provided by the 3GPP network. More specifically, in the example of FIG. 2B, the MTC application may use the MTC server for supplementary services provided by a third-party service provider (that is, a service provider not responsible for 3GPP). The MTC server may perform communication with the 3GPP network through various interfaces. In the example of FIG. 2C, the MTC application may use the MTC server for supplementary services provided by the 3GPP operator (which corresponds to a service provider). Communication between the MTC server and the 3GPP network is performed within a PLMN.

Since the indirect models of FIGS. 2A and 2B are complementary, the 3GPP operator may combine the indirect models for different applications. That is, although not shown in FIGS. 2A~2B, the MTC communication module may be implemented as a hybrid model in which the direct model and the indirect model are simultaneously used. For example, user plane connection may use a direct model and control plane signaling may use an indirect model.

Figure 3:
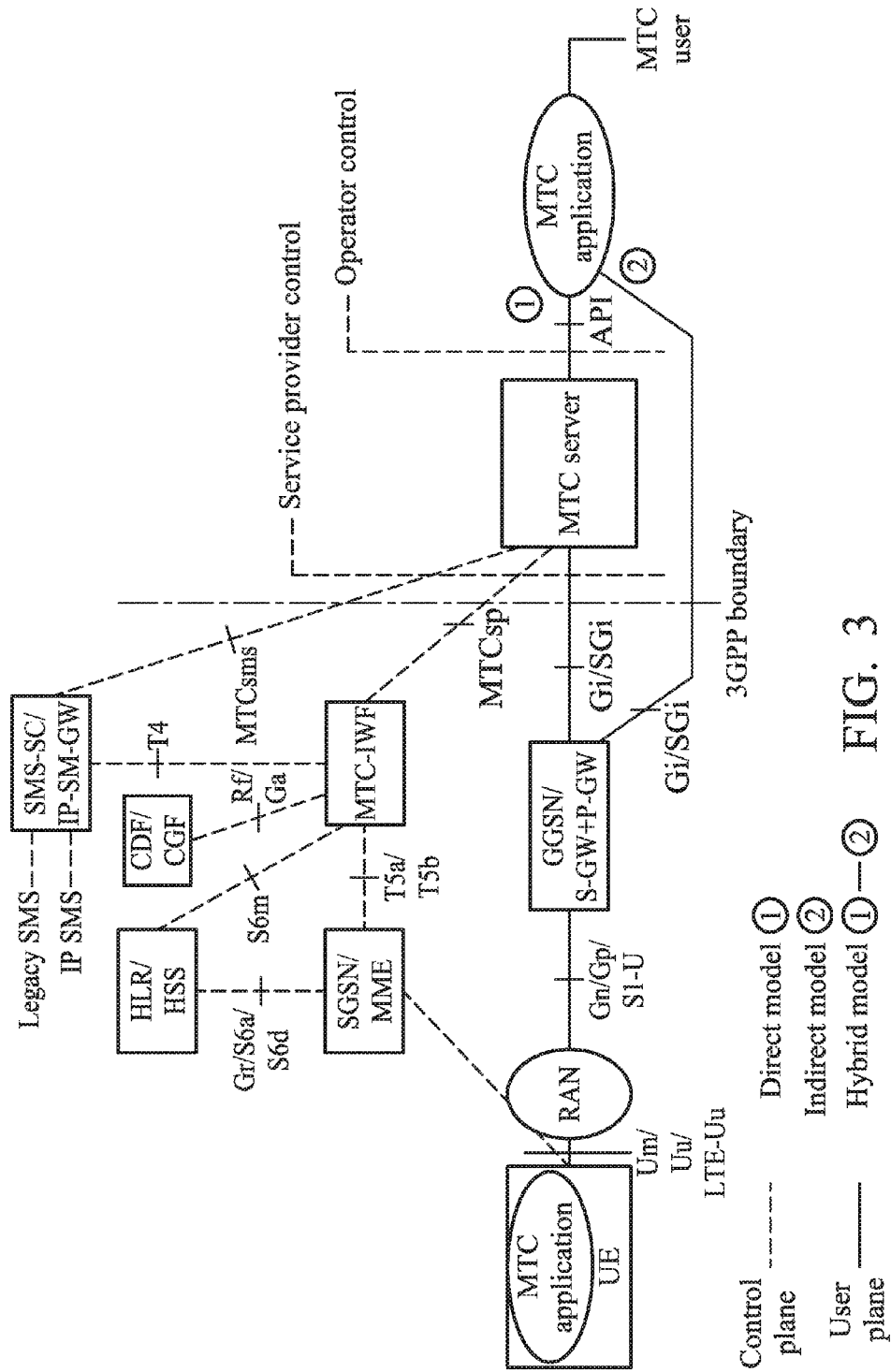
FIG. 3 is a schematic diagram illustrating an exemplary model of an MTC architecture.

FIG. 3 is a schematic diagram 300 illustrating an exemplary model of an MTC architecture.

An end-to-end application between a UE (or an MTC device) used for MTC and an MTC application may use services provided by a 3GPP system and selective services provided by an MTC server. A 3GPP system may provide transport and communication services (including a 3GPP bearer service, an IMS and an SMS) including a variety of optimization services facilitating MTC. In FIG. 3, a UE used for MTC is connected to a 3GPP network (UTRAN, E-UTRAN, GERAN, I-WLAN, etc.) through a Um/Uu/LTE-Uu interface. The architecture of FIG. 3 includes various MTC models described with reference to FIG. 1.

First, entities shown in FIG. 3 will be described.

In FIG. 3, an MTC application server is a server on a network over which an MTC application is executed. Technologies for implementing various MTC applications are applicable to an MTC application server and a detailed description thereof will be omitted. In addition, in FIG. 3, the MTC application server may access an MTC server through a reference point API and a detailed description thereof will be omitted. Alternatively, the MTC application server may be co-located with an MTC server.

An MTC server is a server on a network for managing an MTC device and may be connected to a 3GPP network to communicate with nodes of a PLMN and a UE used for MTC.

An MTC-interworking function (IWF) may control interworking between an MTC server and an operator core network and serve as a proxy for MTC operation. In order to support an MTC indirect or hybrid model, one or more MTC-IWFs may be present in a home PLMN (HPLMN). The MTC-IWF may relay and interpret a signaling protocol on a reference point MTCsp to enable a PLMN to perform a specific function. The MTC-IWF may perform a function for authentication of an MTC server, a function for authentication of a control plane request from an MTC server, various functions associated with the trigger indications, etc., described below before the MTC server establishes communication with a 3GPP network.

A short message service-service center (SMS-SC)/Internet protocol short message gateway (IP-SM-GW) may manage transmission and reception of an SMS. The SMS-SC serves to relay a short message between a short message entity (SME) (an entity for transmitting or receiving a short message) and a mobile station and storing and forwarding the short message. The IP-SM-GW may serve to perform protocol interworking between an IP based UE and an SMS-SC.

A charging data function (CDF)/charging gateway function (CGF) may perform a charging operation.

The HLR/HSS serves to store and provide subscriber information (IMSI, etc.), routing information, configuration information, etc. to the MTC-IWF.

An SGSN/MME may perform a control function such as mobility management, authentication, resource allocation, etc. for connection of a UE to a network. In association with the triggering described below, the SGSN/MME may serve to receive a trigger indication from the MTC-IWF and process the trigger indication into the form of a message provided to the MTC device.

A gateway GPRS support node (GGSN)/serving-gateway (S-GW)+packet data network-gateway (P-GW) may serve as a gateway for connecting a core network to an external network.

Reference points of FIG. 3 are described below. MTCsms is the reference point that an entity outside the 3GPP system uses to communicate with UEs used for MTC via SMS. MTCsp is the reference point that an entity outside the 3GPP system uses to communicate with the MTC-IWF related control plane signaling. T4 is the reference point that is used by MTC-IWF to route device trigger to the SMS-SC in the HPLMN. T5a is the reference point that is used between MTC-IWF and serving SGSN. T5b is the reference point that is used between MTC-IWF and serving MME. S6m is the reference point that is used by MTC-IWF to interrogate HSS/HLR for E.164 MSISDN or external identifier mapping to IMSI and gather UE reachability and configuration information.

User plane communication with an MTC server in case of the indirect and hybrid model and communication with an MTC application server in case of the direct and hybrid model may be performed using a conventional protocol through Gi and SGi.

For details associated with description of FIGS. 1 to 3, refer to 3GPP TS 23.887, which is incorporated herein by reference.

Figure 4:
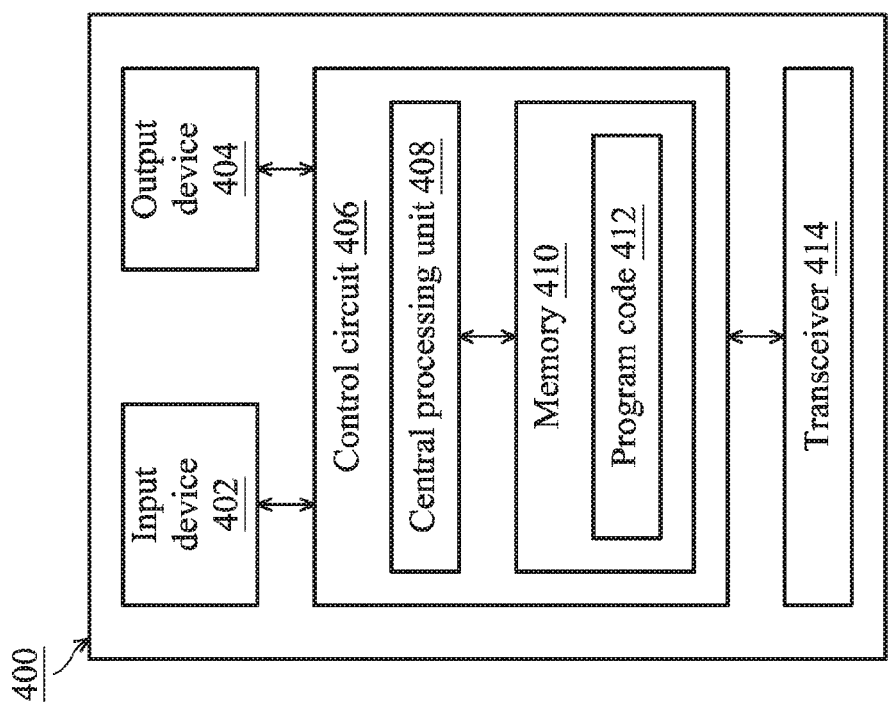
FIG. 4 shows an alternative simplified functional block diagram of a communications device according to one embodiment of the present invention.

Next, referring to FIG. 4, FIG. 4 shows an alternative simplified functional block diagram of a communications device 400 according to one embodiment of the present invention. As shown in FIG. 4, the communication device 400 can be the UE or the base station of FIG. 3, and the communications device 400 is preferably used in the LTE system, the LTE-A system or any other similar wireless communications system. The communications device 400 may include an input device 402, an output device 404, a control circuit 406, a central processing unit (CPU) 408, a memory 410, a program code 412, and a transceiver 414. The control circuit 406 executes the program code 412 in the memory 410 through the CPU 408, thereby controlling the operation of the communications device 400. The communications device 400 can receive signals input by a user through the input device 402, such as a keyboard keypad, touch screen, or microphone (for voice input), and can output images and sounds through the output device 404, such as a screen or speakers. The transceiver 414 is used to receive and transmit wireless signals, deliver received signals to the control circuit 406 wirelessly, and output signals generated by the control circuit 406 wirelessly. In another embodiment, the communications device 400 may further include a timer or a random backoff timer (not shown in FIG. 4) which is used to measure the time for performing subsequent actions.

Figure 5:
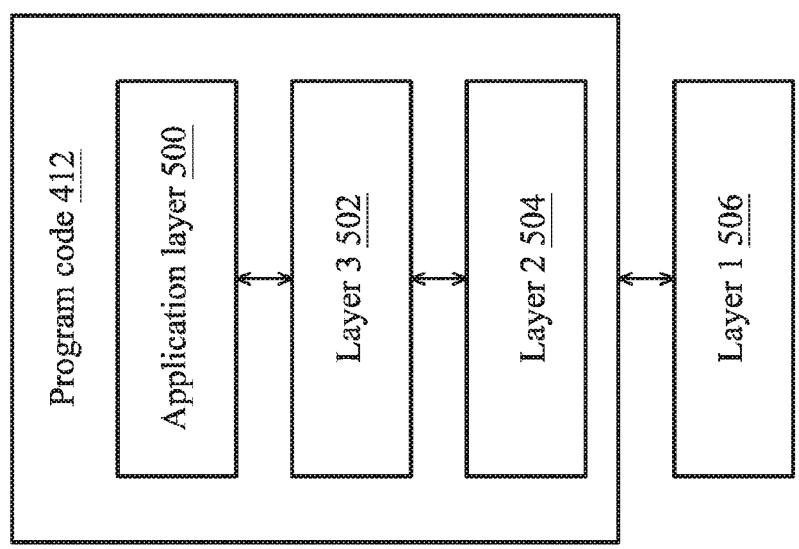
FIG. 5 is a simplified block diagram of the program code shown in FIG. 4 in accordance with one embodiment of the invention.

FIG. 5 is a simplified block diagram of the program code 412 shown in FIG. 4 in accordance with one embodiment of the invention. In this embodiment, the program code 412 includes an application layer 500, a Layer 3 502, and a Layer 2 504, and is coupled to a Layer 1 506. The Layer 3 502 generally performs radio resource control. The Layer 2 504 generally performs link control. The Layer 1 406 generally performs physical connections.

Figure 6:
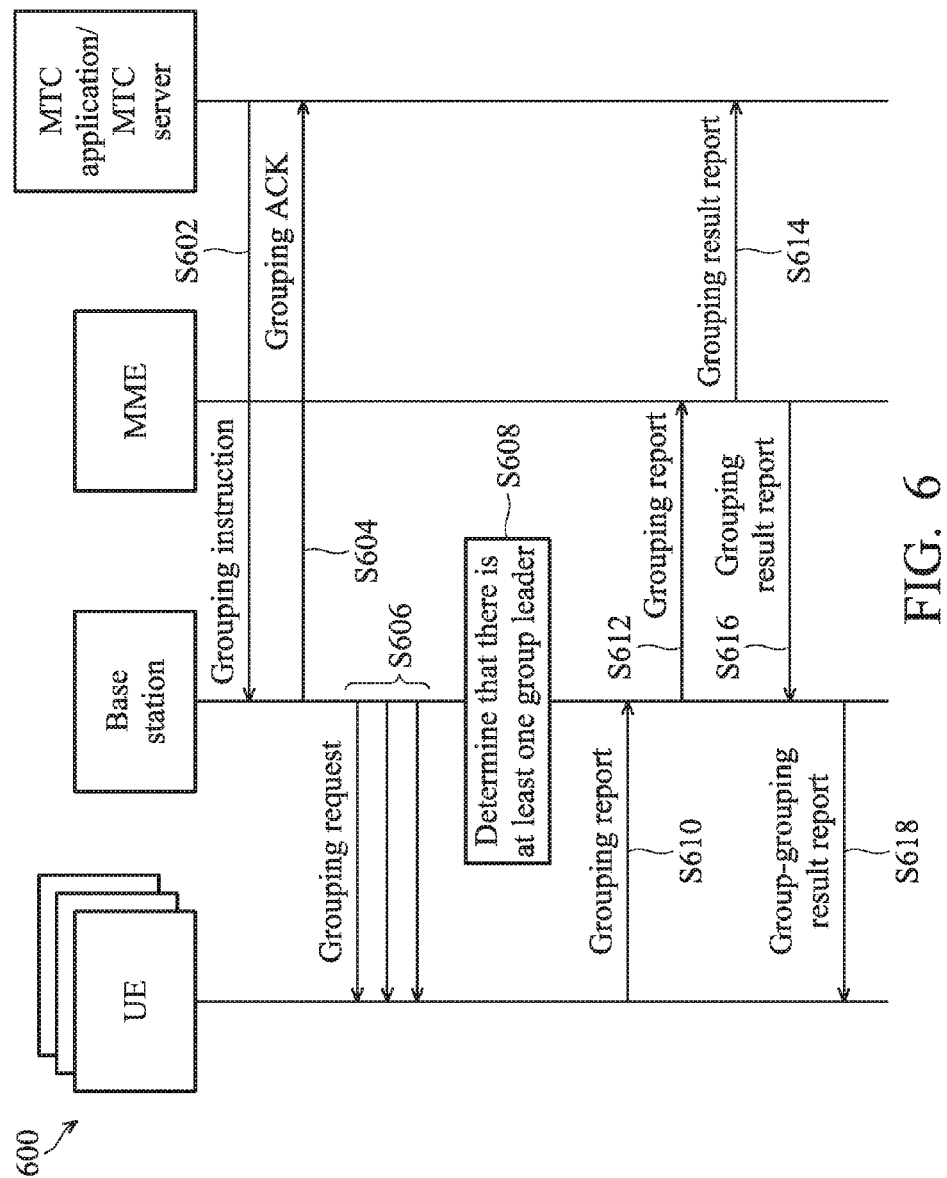
FIG. 6 is a message flow illustrating a grouping procedure based on machine type communication (MTC) according to an embodiment of the present invention.

FIG. 6 shows a message flow 600 illustrating a grouping procedure based on the machine type communication (MTC) according to an embodiment of the present invention.

In step S602, the MTC server/the MTC application transmits a grouping instruction to a base station via a mobility management entity (MME), wherein the grouping instruction is used to request a grouping result report of all UEs in an area. In step S604, after receiving the grouping instruction, the base station transmits a grouping acknowledgement (ACK) back to the MTC server/the MTC application. Then, in step S606, the base station broadcasts grouping requests to a plurality of UEs in the area. It should be noted that after the base station broadcasts the grouping requests to the plurality of UEs, in step S608, the base station determines whether there is at least one group leader among all the UEs. In the embodiment, it has been assumed that the base station determines that there is at least one group leader among all the UEs. Therefore, in step S610, the at least one group leader among all the UEs transmits a respective grouping report to the base station, wherein the grouping report records UE identifiers of all the UEs in a group corresponding to the group leader. After the base station receives the grouping reports from the at least one group leader, in step S612, the base station transmits the grouping reports to the MME. In step S614, the MME generates a grouping result report according to the grouping reports, and transmits the grouping result report to the MTC server/the MTC application, wherein the grouping result report includes at least one group identifier and an International Mobile Subscriber Identification (IMSI) list. In step S616, the MME transmits the grouping result report to the base station. In step S618, the base station receives a group-grouping result report to the at least one group leader among all the UE according to the grouping result report.

Figure 7:
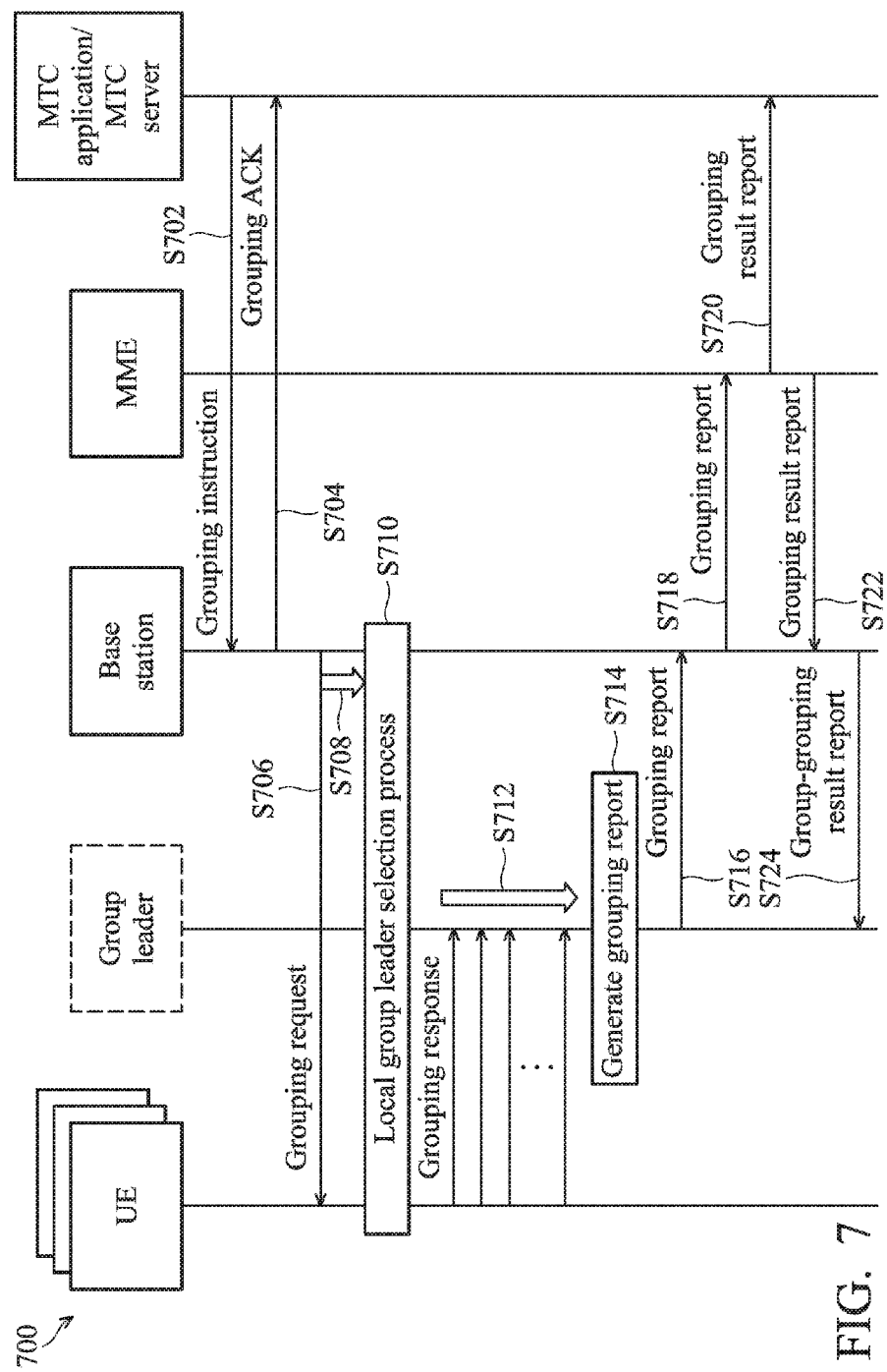
FIG. 7 is a message flow illustrating a grouping procedure based on machine type communication (MTC) according to an embodiment of the present invention.

FIG. 7 is a message flow 700 illustrating a grouping procedure based on machine type communication (MTC) according to an embodiment of the present invention. In the embodiment, it is assumed that the base station determines that there is no group leader among the UEs.

In step S702, the MTC server/the MTC application transmits a grouping instruction to a base station, wherein the grouping instruction is used to request a grouping result report of all UEs in an area. In step S704, after receiving the grouping instruction, the base station transmits a grouping acknowledgement (ACK) to the MTC server/the MTC application. Then, in step S706, the base station broadcasts grouping requests to a plurality of UEs in the area. In step S708, the base station starts a first timer. When the first timer has expired and the base station does not receive the grouping report from at least one group leader, the base station determines that there is no group leader among all the UEs. In step S710, the base station orders all the users in the area to perform a local group leader selection process. The local group leader selection process is illustrated in more detail in FIG. 8.

Next, after at least one group leader is selected, in the step S712, the group leader starts a third timer, and receives a respective grouping response transmitted by remaining UEs, wherein each grouping response at least includes a UE identifier corresponding to a UE itself. When the third timer has expired, in step S714, the group leader generates the grouping report according to the grouping responses. In step S716, the group leader transmits the grouping report to the base station, wherein the grouping report records UE identifiers of the UEs in a group corresponding to the group leader. After the base station receives the grouping report from the group leader, in step S718, the base station transmits the grouping report to the MME. In step S720, the MME generates the grouping result report according to the grouping report and transmits the grouping result report to the MTC server/the MTC application, wherein the grouping result report includes at least one group identifier and an International Mobile Subscriber Identification (IMSI) list. In step S722, the MME transmits the grouping result report to the base station according to the grouping report. In step S724, the base station receives the grouping result report, and transmits a group-grouping result report to the group leader according to the grouping result report. In addition, the base station may store the grouping report and/or the grouping result report into the memory.

Figure 8:
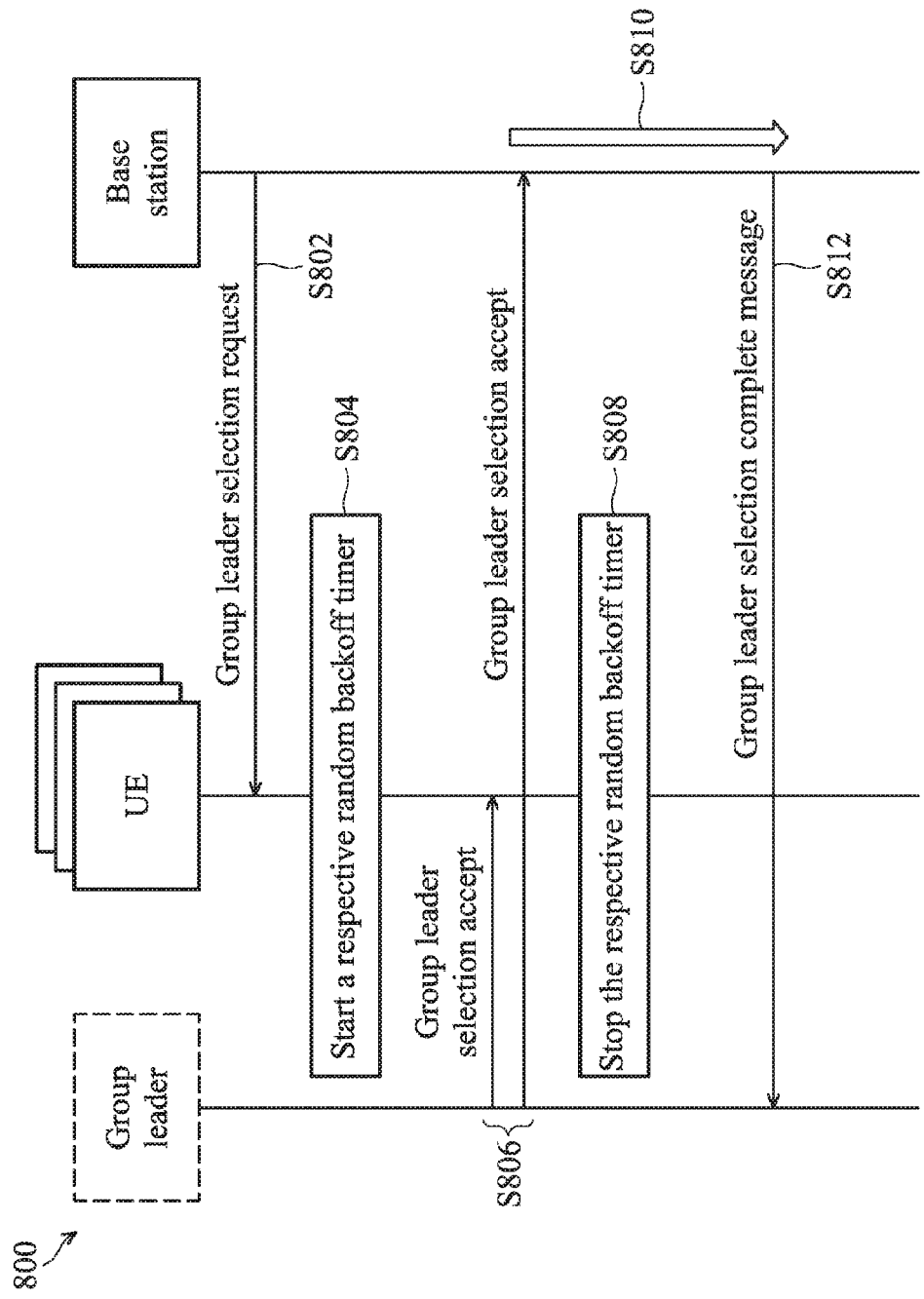
FIG. 8 is a message flow illustrating a local group leader selection process according to an embodiment of the present invention.

FIG. 8 is a message flow 800 illustrating a local group leader selection process according to an embodiment of the present invention.

In step S802, the base station broadcasts group leader selection requests to the UEs. In step S804, after the UEs receive the respective group leader selection requests, the UEs start a respective random backoff timer. In step S806, when the respective random backoff timer has expired, the UE corresponding to the respective random backoff timer unicasts a group leader selection accept to the base station and broadcasts group leader accepts to the remaining UEs, respectively. It should be noted that, in this step, a first UE whose random backoff timer has expired and which does not receive the group leader selection accepts from the remaining UEs becomes the group leader. In other words, the UE whose random backoff timer has expired first is the group leader.

After the remaining UEs receive the group leader selection accepts, in step S808, the remaining UEs stop the respective random backoff timer. After the base station receives the group leader selection accept transmitted from the first UE, in step S810, the base station starts a second timer. Finally, when the second timer has expired, in step S812, the base station transmits a group leader selection complete message to the group leader for instructing that the local group leader selection process procedures is completed.

Figure 9:
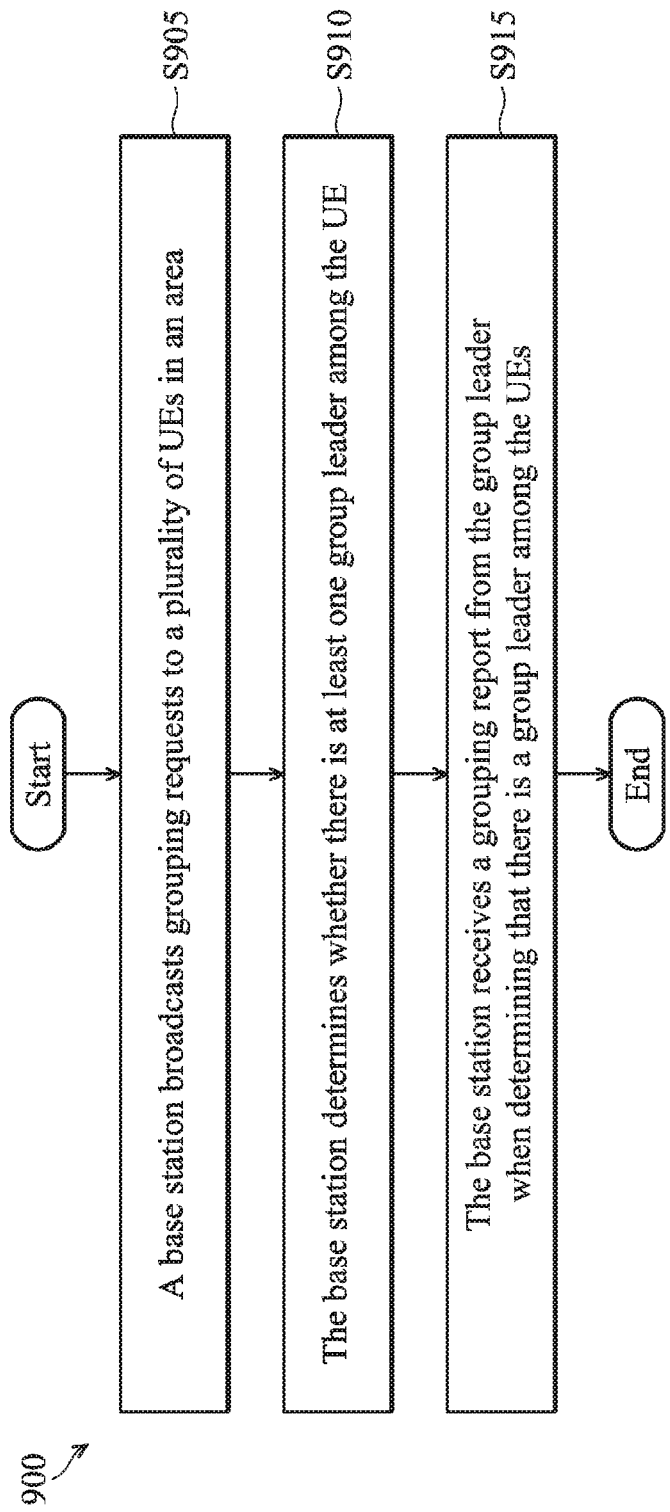
FIG. 9 is a flow chart illustrating a grouping method based on MTC according to an embodiment of the invention.

FIG. 9 is a flow chart 900 illustrating a grouping method based on MTC according to an embodiment of the invention, and the method is used in a communications system. In step S905, a base station broadcasts grouping requests to a plurality of user equipments (UEs) in an area. In step S910, the base station determines whether there is at least one group leader among the UE. In step S915, the base station receives a grouping report from the group leader when determining that there is a group leader among the UEs, wherein the grouping report records UE identifiers of the UEs in a group corresponding to the group leader.

FIG. 10 is a flow chart 1000 illustrating a grouping method based on machine type communication (MTC) according to an embodiment of the invention, and the method is used in an user equipments (UE). In step S1005, the UE receives a group leader selection request from a base station. In step S1010, the UE starts a random backoff timer. Then, in step S1015, when the random backoff timer has expired and the UE does not receive any group leader selection accept from at least one second UE, the UE broadcasts the group leader selection accepts to the base station and the at least one second UE, respectively, wherein the UE becomes a group leader. Finally, in step S1020, the UE receives a group leader selection complete message transmitted from the base station. In one embodiment, since the second UEs may also receive the respective group leader selection request from the base station and start the respective random backoff timer, the second UEs may stop the respective random backoff timer when receiving the respective group leader selection accepts.

In one embodiment, a random backoff timer of a third UE used to be the group leader can be set to 0. That is to say, when the base station broadcasts the group leader selection requests, the third UE can unicast a group leader selection accept to the base station immediately and broadcast group leader selection accepts to the remaining UEs. It should be noted that, in this embodiment, the base station may further compare the grouping report or the grouping result report stored in the memory. When the base station determines that the third UE broadcasting the group leader selection accepts used to be the group leader, the base station orders the third user device as the group leader directly. On the other hand, if the third UE has not become the group leader, the base station can determine to perform the local group leader selection process for all the UEs, or perform the local group leader selection device process for the UEs which are not grouped.

In addition, the central processing unit 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A grouping method based on machine type communication (MTC), used in a communications system, comprising:
broadcasting, by a base station, grouping requests to a plurality of user equipments (UEs) in an area;
determining, by the base station, whether there is at least one group leader among the UEs; and
receiving, by the base station, a grouping report from the group leader when determining that there is a group leader among the UEs,
wherein the grouping report records UE identifiers of the UEs in a group corresponding to the group leader.

2. The grouping method based on machine type communication (MTC) as claimed in claim 1, the method further comprising:
starting, by the base station, a first timer;
determining that there is no group leader among the UEs when the first timer has expired and the base station does not receive the grouping report from the group leader; and
performing a local group leader selection process.

3. The grouping method based on machine type communication (MTC) as claimed in claim 2, the local group leader selection process further comprising:
broadcasting, by the base station, group leader selection requests to the UEs;

starting, by the UEs, a respective random backoff timer after the UEs receive the group leader selection requests; and unicasting, by the UEs corresponding to the respective random backoff timer, a group leader selection accept to the base station and broadcasting the group leader selection accepts to remaining UEs, respectively, when the respective random backoff timer has expired, wherein a first UE whose random backoff timer has expired and which does not receive the group leader selection accepts from the remaining UEs becomes the group leader.

4. The grouping method based on machine type communication (MTC) as claimed in claim 3, the local group leader selection process further comprising:

stopping the respective random backoff timer after the remaining UEs receive the respective group leader selection accept.

5. The grouping method based on machine type communication (MTC) as claimed in claim 3, the local group leader selection process further comprising:

starting a second timer after the base station receives the group leader selection accept transmitted from the first UE; and transmitting, by the base station, a group leader selection complete message to the group leader when the second timer has expired.

6. The grouping method based on machine type communication (MTC) as claimed in claim 5, the local group leader selection process further comprising:

starting, by the group leader, a third timer, and receiving a respective grouping response transmitted by the remaining UEs, wherein the grouping response at least includes a UE identifier corresponding to the UE itself; and generating, by the group leader, the grouping report according to the grouping responses, and transmitting the grouping report to the base station after the third timer has expired.

7. The grouping method based on machine type communication (MTC) as claimed in claim 1, wherein before the base station broadcasts the grouping requests to the plurality of UEs, the method further comprising:

receiving, by the base station, a grouping instruction transmitted by a Machine Type Communication (MTC) application/a MTC server, wherein the grouping instruction is used to request a grouping result report of all UEs in the area.

8. The grouping method based on machine type communication (MTC) as claimed in claim 7, wherein after the base station receives the grouping report from the group leader, the method further comprising:

transmitting, by the base station, the grouping report to a Mobility Management Entity (MME); and transmitting, by the MME, the grouping result report to the MTC application/the MTC server according to the grouping report, wherein the grouping result report includes at least one group identifier and an International Mobile Subscriber Identification (IMSI) list.

9. The grouping method based on machine type communication (MTC) as claimed in claim 8, the method further comprising:

transmitting, by the MME, the grouping result report to the base station according to the grouping report.

10. The grouping method based on machine type communication (MTC) as claimed in claim 9, the method further comprising:

transmitting, by the base station, a group-grouping result report to the group leader.

11. The grouping method based on machine type communication (MTC) as claimed in claim 3, the method further comprising:

setting the random backoff timer of the group leader to 0.

12. A grouping method based on machine type communication (MTC), used in a user equipment (UE), comprising:

receiving a group leader selection request;
starting a random backoff timer; and
broadcasting the group leader selection accepts to the base station and at least one second UE, respectively, when the random backoff timer has expired and the UE does not receive any group leader selection accept from the at least one second UE, wherein the UE becomes a group leader; and receiving a group leader selection complete message transmitted from the base station.

13. The grouping method based on machine type communication (MTC) as claimed in claim 12, further comprising:

stopping the respective random backoff timer when the second UEs receive the respective group leader selection accepts.

14. A communications system for grouping user equipments (UEs) based on machine type communication (MTC), comprising:

a base station, broadcasting grouping requests; and
a plurality of UEs, receiving the respective grouping requests;

wherein the base station determines whether there is at least one group leader among the UEs; the base station receives a grouping report from the group leader when determining that there is a group leader among the UEs, wherein the grouping report records UE identifiers of the UEs in a group corresponding to the group leader.

15. The communications system for grouping UEs based on MTC as claimed in claim 14, wherein the base station further comprises:

a first timer,
wherein the base station starts the first timer after broadcasting the grouping requests; the base station determines that there is no group leader among the UEs when the first timer has expired and the base station does not receive the grouping report from the group leader; and the base station performs a local group leader selection process.

16. The communications system for grouping UEs based on MTC as claimed in claim 15, wherein the local group leader selection process further comprises:

the base station broadcasts group leader selection requests to the UEs;

the UEs start a respective random backoff timer after the UEs receive the group leader selection requests; and the UEs corresponding to the respective random backoff timers unicast a group leader selection accept to the base station and broadcast the group leader selection accepts to remaining UEs, respectively, when the respective random backoff timer has expired, wherein a first UE whose random backoff timer has expired and which does not receive the group leader selection accepts from the remaining UEs becomes the group leader.

17. The communications system for grouping UEs based on MTC as claimed in claim 16, wherein the local group leader selection process further comprises:
   the remaining UEs stop the respective random backoff timer after receiving the respective group leader selection accept.

18. The communications system for grouping UEs based on MTC as claimed in claim 16, wherein the local group leader selection process further comprises:
   the base station starts a second timer after receiving the group leader selection accept transmitted from the first UE; and
   the base station transmits a group leader selection complete message to the group leader when the second timer has expired.

19. The communications system for grouping UEs based on MTC as claimed in claim 18, wherein after the base station determines that there is a group leader among the UEs, the group leader starts a third timer and receives a respective grouping response transmitted by the remaining UEs, wherein the grouping response at least includes a UE identifier corresponding to the UE itself; and the group leader generates the grouping report according to the grouping responses, and transmits the grouping report to the base station after the third timer has expired.

20. The communications system for grouping UEs based on MTC as claimed in claim 14, wherein before the base station broadcasts the grouping requests to the UEs, the base station receives a grouping instruction transmitted by a Machine Type Communication (MTC) application/a MTC server, wherein the grouping instruction is used to request a grouping result report of all UEs in the area.

21. The communications system for grouping UEs based on MTC as claimed in claim 20, further comprising:
   a Mobility Management Entity (MME),
   wherein after the base station receives the grouping report from the group leader, the base station transmits the grouping report to the MME; the MME transmits the grouping result report to the MTC application/the MTC server according to the grouping report, wherein the grouping result report includes at least one group identifier and an International Mobile Subscriber Identification (IMSI) list.

22. The communications system for grouping UEs based on MTC as claimed in claim 21, wherein the MME transmits the grouping result report to the base station according to the grouping report.

23. The communications system for grouping UEs based on MTC as claimed in claim 22, wherein the base station transmits a group-grouping result report to the group leader.

24. The communications system for grouping UEs based on MTC as claimed in claim 16, wherein the random backoff timer of the group leader is set to 0.

25. A communication device for grouping user equipments (UEs) based on machine type communication (MTC), comprising:
   a control circuit;
   a processor installed in the control circuit; and
   a memory installed in the control circuit and operatively coupled to the processor;
   wherein the processor is configured to execute a program code stored in the memory to:
   receive a group leader selection request transmitted from a base station;
   start a random backoff timer; and
   broadcast the group leader selection accepts to the base station and at least one second UE, respectively, when the random backoff timer has expired and the UE does not receive any group leader selection accept from the at least one second UE, wherein the UE becomes a group leader; and
   receive a group leader selection complete message transmitted from the base station.

26. The grouping method based on machine type communication (MTC) as claimed in claim 25, wherein the processor further executes the program code stored in the memory to:
   stop the respective random backoff timer when the second UEs receive the respective group leader selection accepts.

* * * * *